United States Patent
Moraru et al.

(10) Patent No.: US 9,752,881 B2
(45) Date of Patent: Sep. 5, 2017

(54) LOCATING SERVICES

(71) Applicant: Intel Corporation, Santa Clara, CA (US)

(72) Inventors: Catalin Moraru, Bucharest (RO); Silviu Petria, Stilpeni (RO)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 14/581,824

(22) Filed: Dec. 23, 2014

(65) Prior Publication Data

US 2016/0178379 A1  Jun. 23, 2016

(51) Int. Cl.
| | |
|---|---|
| *H04W 84/12* | (2009.01) |
| *G01C 21/20* | (2006.01) |
| *H04W 4/02* | (2009.01) |
| *H04W 84/18* | (2009.01) |

(52) U.S. Cl.
CPC ............ *G01C 21/206* (2013.01); *H04W 4/02* (2013.01); *H04W 84/12* (2013.01); *H04W 84/18* (2013.01)

(58) Field of Classification Search
CPC .................................. G01C 21/32; H04M 3/00
USPC .......................... 701/209, 532, 533; 455/418
See application file for complete search history.

(56) References Cited

U.S. PATENT DOCUMENTS

| | | | | | |
|---|---|---|---|---|---|
| 2003/0033394 | A1* | 2/2003 | Stine | .................... | H04L 12/5695 709/222 |
| 2004/0054428 | A1* | 3/2004 | Sheha | ................ | G01C 21/3664 700/56 |
| 2005/0190784 | A1* | 9/2005 | Stine | ...................... | H04L 45/40 370/445 |
| 2007/0010934 | A1* | 1/2007 | Breitenberger | ...... | G08G 1/0104 701/117 |
| 2008/0186869 | A1* | 8/2008 | Jeon | ........................ | H04L 45/26 370/252 |
| 2009/0171576 | A1* | 7/2009 | Kim | .................... | G01C 21/3632 701/533 |
| 2010/0292914 | A1* | 11/2010 | Vepsalainen | ....... | G01C 21/3453 701/532 |
| 2014/0354688 | A1 | 12/2014 | Min et al. | | |

(Continued)

FOREIGN PATENT DOCUMENTS

| | | |
|---|---|---|
| KR | 20120005196 A | 1/2012 |
| WO | 2011139115 A2 | 11/2011 |

OTHER PUBLICATIONS

International Search Report, PCT No. PCT/US2015/055135, mailed on Jan. 27, 2016, 3 pages.

*Primary Examiner* — Thomas G Black
*Assistant Examiner* — Wae Louie
(74) *Attorney, Agent, or Firm* — International IP Law Group, P.L.L.C.

(57) ABSTRACT

A method and apparatus for locating points of interest using an ad-hoc network is provided. An exemplary method includes establishing an ad-hoc network between mobile devices and fixed location devices, wherein the fixed location devices are associated with points of interest. A distance from a mobile device to a point of interest is determined based, at least in part, on the number of hops between the mobile device and other mobile devices to reach the point of interest. A direction to the point of interest is determined based, at least in part, on the number of hops between mobile devices proximate to the mobile device and the point of interest.

25 Claims, 6 Drawing Sheets

(56) References Cited

U.S. PATENT DOCUMENTS

2015/0120408 A1\* 4/2015 Liu ...................... H04W 4/021
                                                              705/14.12

\* cited by examiner

100

400

LOCATING SERVICES

TECHNICAL FIELD

The present invention relates generally to devices for use in ad-hoc networks. More specifically the present invention relates to devices that can be used to locate services in large environments.

BACKGROUND

Attending public events at large venues, such as soccer games at stadiums, is quite common. However finding a specific place at such a venue, such as a medical treatment center, a restroom, or an emergency exit can be a challenge. Most solutions for finding services at public events include physical signs, event staff, or printed maps of the venue. However, when surrounded by a large crowd, it is difficult to find signs or persons to provide guidance. Mobile devices may not be helpful, due to a lack of cellular network access or an excess of mobile devices attempting to connect. Because the increased number of users is only temporary, network operators will often not invest in long-term infrastructure in areas where large crowds congregate only on occasion.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The internet of things (IoT) is a concept in which a large number of computing devices are interconnected to each other and to the Internet to provide functionality and data acquisition at very low levels. For example, IoT networks may include commercial and home automation devices, such as light switches, thermostats, locks, cameras, alarms, motion sensors, and the like. Other devices may include sensors for health and fitness monitoring, such as pedometers and scales. These devices may be accessible through remote computers, smart phones, and other systems, for example, to control systems or access data.

This contribution aims to provide navigation to a point of interest in a small geographical area without internet connection or GPS. The solution is better than GPS for cases where the users are inside a building, although the solution will work outside, or in mixed venues. As used herein, a point of interest may include a service, such as a medical tent, food service, beverage service, and the like.

In the technique, users connect to an ad-hoc wireless network or mesh through an application program (app) on a mobile device. Points of interest, such as medical care, food service, automated teller machines, and the like, are also connected to this network and constantly broadcast location messages. Location messages are distributed through the ad-hoc mesh network. The mobile devices receiving the messages may determine a relative distance and a direction to a point of interest. In one embodiment, the app functions as an electronic compass that actively indicates direction and approximate distance to a desired point. As the network is directly between mobile devices, there is no dependence on outside inputs, such as GPS.

Figure 1:
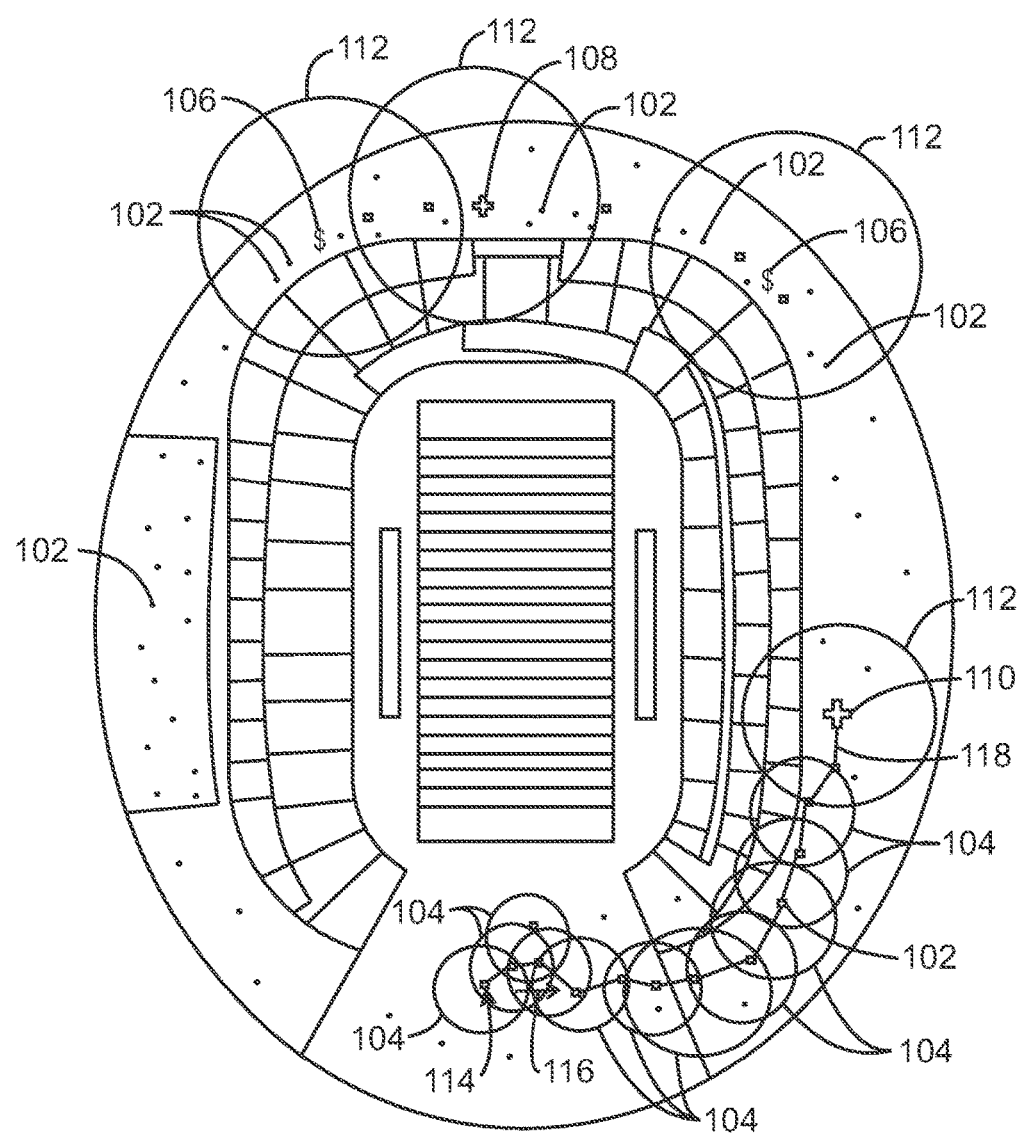
FIG. 1 is a drawing of a venue, illustrating the use of an ad-hoc network between mobile devices to locate points of interest.

FIG. 1 is a drawing of a venue 100, illustrating the use of an ad-hoc network between mobile devices to locate points of interest. Users 102 can connect to this network by using their mobile device's Wi-Fi™ transceivers (e.g., to participate in a wireless local area network) and Bluetooth® transceivers, and a special navigation application (app) installed on the device. In the venue 100, each user that is using the navigation app on their mobile device 102 to participate in an ad-hoc network is shown as a dot. Many more persons are likely to be in the venue 100 than the participants in the ad-hoc network, but are not illustrated in order to simplify the figure. Further, not every mobile device 102 is labeled.

Each of the mobile devices 102 has a range 104 of connectivity that overlaps other mobile devices 102. The diameter of the range 104 for each mobile device 102 may depend on the type of phone or transmitter used, such as a wireless local area connection (WLAN) or a Bluetooth® connection among others. For example, the WLAN may have a greater range than a Bluetooth® connection.

Various points of interest can join the ad-hoc network through a fixed device that has Wi-Fi™ or Bluetooth® connectivity and is capable of connecting to the network as a regular node. Interest points may include ATMs 106, medical sites 108 and 110, and others. The device can be anything from a dedicated Wi-Fi™ capable board to an Internet access point. Each of the devices for the points of interest 106, 108, and 110, will have a transmission range 112 that overlaps a portion of the mobile devices 102. As the users 102 and points of interest 106, 108, and 110, connect to the ad-hoc wireless network, a communications path is formed between any one mobile device 102, such as device 114 and the devices located at the points of interest 106, 108, and 110.

In the example shown in FIG. 1, the user of device 114 wishes to find a closest medical site 110. An analysis of the ad-hoc network can be used to give the user of the device 114 a direction 116 to reach the medical site, and an approximate distance. The direction may be the direction of the shortest communications path 118 between the user device 114 and the medical site 110, e.g., the path with the lowest number of hops between mobile devices 102. The distance can be expressed as the number of hops to reach the medical site 110. In one embodiment, the distance to the medical site 110, or other points of interest, may be estimated by comparing the number of hops on the shortest path to the number of hops on the shortest path to other locations, such as another medical site 108. This distance may then be expressed in meters or other units.

Figure 2:
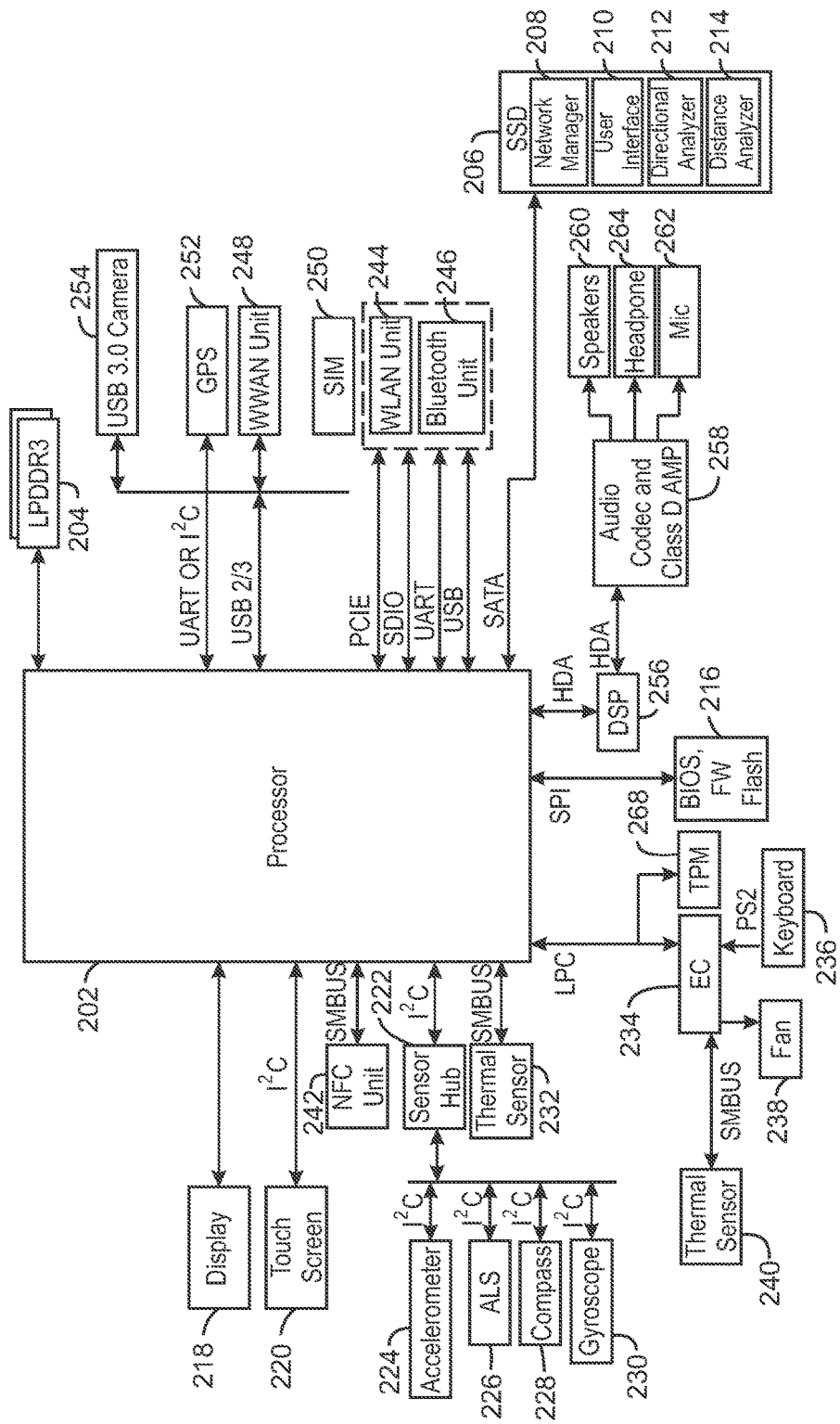
FIG. 2 is a block diagram of components that may be present in a computer system used for venue navigation.

FIG. 2 is a block diagram of components that may be present in a computer system 200 used for venue navigation. The computer system 200 may include any combinations of the components. The components may be implemented as ICs, portions thereof, discrete electronic devices, or other modules, logic, hardware, software, firmware, or a combination thereof adapted in the computer system 200, or as components otherwise incorporated within a chassis of the computer system 200. The block diagram of FIG. 2 is intended to show a high level view of many components of the computer system 200. However, some of the components shown may be omitted, additional components may be present, and different arrangement of the components shown may occur in other implementations. The computer system 200 may be a cellular telephone, a tablet, or another mobile device.

As seen in FIG. 2, a processor 202, in one embodiment, includes a microprocessor, multi-core processor, multi-threaded processor, an ultra low voltage processor, an embedded processor, or other known processing element. In the illustrated implementation, processor 202 acts as a main processing unit and central hub for communication with many of the various components of the system 200. As one example, processor 200 is implemented as a system on a chip (SoC). As a specific illustrative example, processor 202 includes an Intel® Architecture Core™ based processor, such as an Atom, an i3, an i5, an i7 or another such processor available from Intel Corporation, Santa Clara, Calif. However, other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an apple A5/A6 processor, a Qualcomm Snapdragon processor, or TI OMAP processor.

The processor 202 may communicate with a system memory 204. Any number of memory devices may be used to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, one or more operating systems and so forth, a mass storage 206 may also couple to the processor 202. To enable a thinner and lighter system design the mass storage may be implemented via a SSD. However, the mass storage may be implemented using a micro hard disk drive (HDD) in some computing systems 200. The mass storage 206 may include a number of modules to implement the functions described herein. These modules may be part of a navigation app used to locate services at a venue. For example, a network manager 208 may be included to manage participation of the mobile device in the ad-hoc network. A user interface 210 may display a list of possible services, for example, obtained from the ad-hoc network. A directional analyzer 212 may be used to determine the direction the user needs to move to reach a selected service. For example, this may be displayed by the user interface 210 as an arrow indicating the direction a user needs to move to reach the closest site for the selected service. A distance analyzer 214 may be used to determine the estimated distance, in hops or physical units, to the closest site for the selected service. The distance may be displayed by the user interface 210 as a number under the arrow indicating direction. As distance may be more accurate with more participants in the ad-hoc network, the user interface 210 may include setting allowing the user to switch the distance display between number of hops, physical units, or off.

Also shown in FIG. 2, a flash device 216 may be coupled to the processor 202, e.g., via a serial peripheral interface (SPI). The flash device 216 may provide for non-volatile storage of system software, including a basic input/output software (BIOS) as well as other firmware of the system.

Various input/output (I/O) devices may be present within the computer system 200. Specifically shown in the embodiment of FIG. 2 is a display 218 which may be a high definition LCD or LED panel. This display panel may also provide for a touch screen 220, e.g., adapted externally over the display 218 such that via a user's interaction with the touch screen 220, user inputs can be provided to the computer system 200 to enable desired operations, e.g., for making phone calls, accessing a navigation app, selecting a desired point of interest, and so forth. In one embodiment, the display 218 may be coupled to processor 202 via a display interconnect that can be implemented as a high performance graphics interconnect. Touch screen 220 may be coupled to processor 202 via another interconnect, which in an embodiment can be an I2C interconnect.

The computer system 200 may provide for a display multi-touch panel that allows selection of items, pinch zoom, and other functionality for a mobile device. In one embodiment, the touch screen may have a damage and scratch-resistant glass and coating, such as Gorilla Glass™ or Gorilla Glass 2™. The display 218 may have an edge-to-edge glass with a minimal screen bezel that is also flush with the panel surface, and limited I/O interference when using multi-touch.

For perceptual computing and other purposes, various sensors may be present within the system and may be coupled to processor 202 in different manners. Certain inertial and environmental sensors may couple to processor 202 through a sensor hub 222, e.g., via an I$^2$C interconnect. In the embodiment shown in FIG. 2, these sensors may include an accelerometer 224, an ambient light sensor (ALS) 226, a compass 228 and a gyroscope 230. Other environmental sensors may include one or more thermal sensors 232 which in some embodiments couple to processor 202 via a system management bus (SMBus) bus.

Also seen in FIG. 2, various peripheral devices may couple to processor 202 via a low pin count (LPC) interconnect. In the embodiment shown, various components can be coupled through an embedded controller 234. Such components can include a keyboard 236 (e.g., coupled via a PS2 interface), a fan 238, and a thermal sensor 240.

In a particular implementation, peripheral ports may include a high definition media interface (HDMI) connector (which can be of different form factors such as full size, mini or micro). The computer system 200 can include one or more USB ports, such as a micro-USB port in accordance with the Universal Serial Bus Revision 3.0 Specification (November 2008) for data transfer and charging of a battery in the computing device 200. Other ports may include an externally accessible card reader such as a micro size SD-XC card reader and/or a SIM card reader for WWAN, e.g., an 8 pin card reader. For audio, the computer system 200 can include a 3.5 mm jack with stereo sound and microphone capability, e.g., combination functionality, with support for jack detection, e.g., headphone only support using microphone in the computer system 200 or a headphone with microphone in cable. In some embodiments, this jack can be re-taskable between stereo headphone and stereo microphone input.

The computer system 200 can communicate with external devices in a variety of manners, including wirelessly. In the embodiment shown in FIG. 2, various wireless modules, each of which can correspond to a radio configured for a particular wireless communication protocol, are present. One manner for wireless communication in a short range such as a near field may be via a near field communication (NFC) unit 242 which may communicate, in one embodiment with processor 202 via an SMBus. Note that devices in close proximity to each other can communicate through the NFC unit 242.

As further seen in FIG. 2, additional wireless units can include other short range wireless engines including a WLAN unit 244 and a Bluetooth® unit 246. Using WLAN unit 244, Wi-Fi™ communications in accordance with a given Institute of Electrical and Electronics Engineers (IEEE) 802.11 standard can be realized, while via Bluetooth® unit 246, short range communications via a Bluetooth® protocol can occur. These units may communicate with processor 202 via any number of links, such as a USB link, a universal asynchronous receiver transmitter (UART) link, or via an interconnect according to a Peripheral Component Interconnect Express™ (PCIe™) protocol, e.g., in accordance with the PCI Express™ Specification Base Specification version 3.0 (published Jan. 17, 2007). Other protocols that may be used include a serial data input/output (SDIO) standard.

In addition, wireless wide area communications, e.g., according to a cellular or other wireless wide area protocol, can occur via a WWAN unit 248 which in turn may couple to a subscriber identity module (SIM) 250. In addition, to enable receipt and use of location information, a GPS module 252 may also be present. Note that in the example shown in FIG. 2, the WWAN unit 248 and an integrated capture device such as a camera module 254 may communicate via a given USB protocol such as a USB 2.0 or 3.0 link, or a UART or I2C protocol. The actual physical connection of these units can be via adaptation of a NGFF add-in card to an NGFF connector configured on the motherboard, or as part of a SoC configuration, among others.

In a particular embodiment, wireless functionality can be provided modularly, e.g., with a Wi-Fi™ 802.11 ac solution, e.g., add-in card that is backward compatible with IEEE 802.11abgn. This card can be configured in an internal slot, e.g., via an NGFF adapter. An additional module may provide for Bluetooth® capability, e.g., Bluetooth® 4.0 with backwards compatibility, as well as Intel® Wireless Display functionality. An additional module may be a WWAN device that can provide support for 3G/4G/LTE and GPS. This module can be installed in an internal slot, such as a NGFF. Integrated antenna support can be provided for WiFi™, Bluetooth®, WWAN, NFC and GPS, enabling seamless transition from WiFi™ to WWAN radios, wireless gigabit (WiGig) in accordance with the Wireless Gigabit Specification (July 2010), and vice versa.

The computer system 200 may provide for audio inputs and outputs, by an audio processor which may be a digital signal processor (DSP) 256, which may couple to processor 202 via a high definition audio (HDA) link. Similarly, the DSP 256 may communicate with an integrated coder/decoder (CODEC) and amplifier 258 that in turn may couple to output speakers 260 which may be implemented within the chassis. Similarly, the CODEC and amplifier 258 can be coupled to receive audio inputs from a microphone 262 which in an embodiment can be implemented via dual array microphones (such as a digital microphone array) to provide for high quality audio inputs to enable voice-activated control of various operations within the system. Note also that audio outputs can be provided from CODEC and amplifier 262 to a headphone jack 264. Although shown with these particular components in the embodiment of FIG. 2, understand the scope of the present invention is not limited in this regard.

In some examples, a security module such as a TPM can be integrated into a processor or can be a discrete device such as a TPM 2.0 device 268. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Through the wireless connection devices, e.g., the WLAN unit 244 or the Bluetooth® unit 246, the computing device 200 may participate in an ad-hoc network. The network infrastructure has the ability to route messages between mobile devices without access to an uplink. This is done by using a routing protocol at layer 2, such as the better approach to mobile ad-hoc networking (BATMAN) protocol, the optimized link state routing (OLSR) protocol, or other protocols. For example, the BATMAN protocol creates a virtual interface at layer 3 and groups all layer 2 interfaces, for Wi-Fi™ or Bluetooth® connections. Through the ad-hoc network, the computing device can determine a direction and approximate distance to a target location, for example, as described in further detail with respect to FIGS. 3 and 4.

Figure 3:
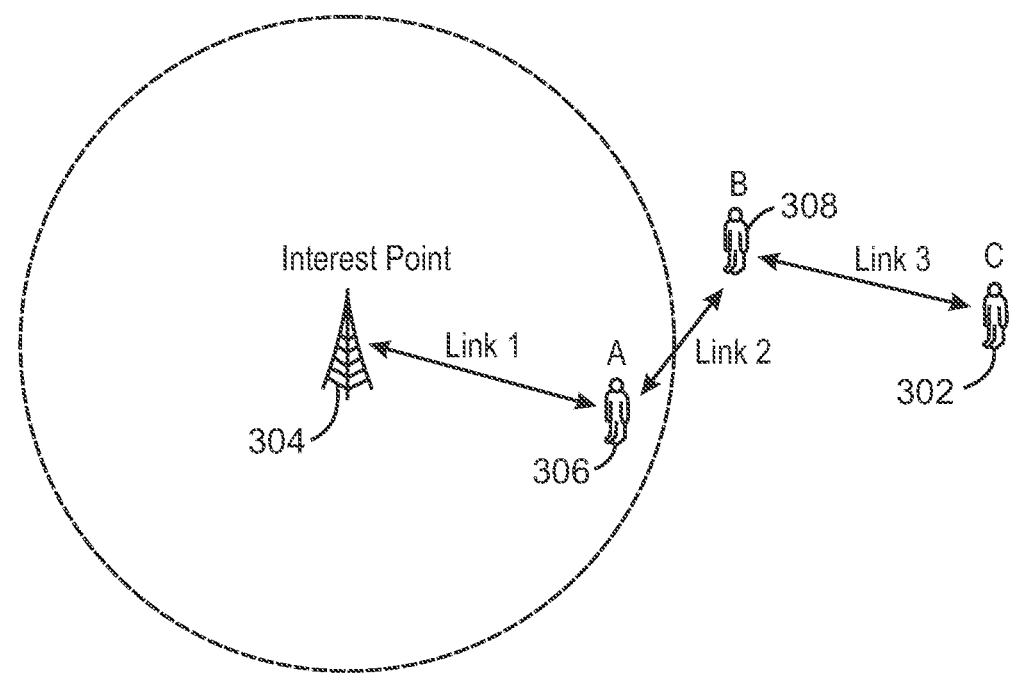
FIG. 3 is a drawing of a mesh network showing a determination of a distance to service.

FIG. 3 is a drawing of a mesh network 300 showing a determination of a distance to service. As described herein, the solutions enables two different functionalities, approximation of distance and direction to a target, both determined without the use of an uplink. For both functionalities, a user must be connected to the mesh network and a reasonable number of nodes, e.g., mobile devices running a navigation app, must be present in the network.

The relative distance from a user 302 to the desired point of interest 304 may be determined from the minimal hops needed for a broadcast message from the point of interest 304 to reach a particular user 302. The point of interest 304 acts like a beacon and transmits periodical broadcast messages into the network. Those messages are routed to every reachable user, in a way that will prevent broadcast storms. Every broadcast message contains an integer representing the number of intermediate points or hops to the target. An intermediary point increments this number before sending it further. As described with respect to FIG. 1, the environment of the ad-hoc network may be used to refine the information. For example, if a large number of nodes are present in the ad-hoc network, the different paths from the point of interest 304 to the user 302 may be used to calculate a more accurate distance, for example, by estimating the proportional distance from the user 302 to the target.

Figure 4:
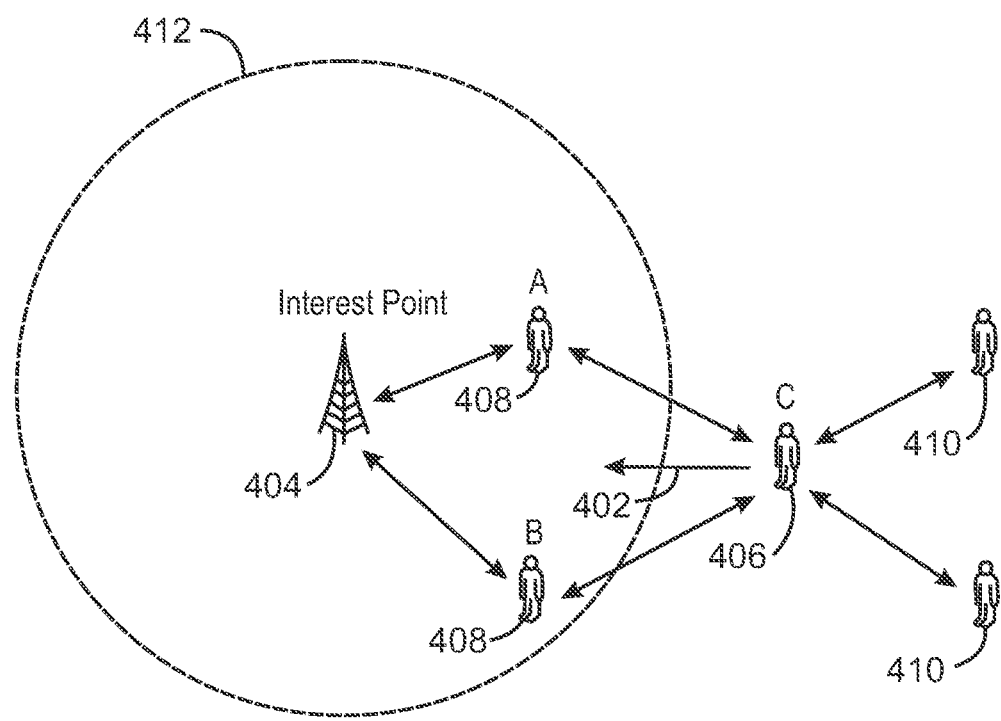
FIG. 4 is a drawing of a mesh network showing a determination of the direction to a desired point of interest.

FIG. 4 is a drawing of a mesh network 400 showing a determination of the direction 402 to a desired point of interest 404. The direction 402 to the desired point of interest may be determined based on the relative location of the user 406 to other users 408 that are closer to that point of interest 404 versus users 410 that are farther from the point of interest 404. The direction to the users 408 and 408 nearest to the user 406 may be determined by detect the direction to a specific point based on radio technology. Although, this could be used to determine the direction to the point of interest 404, this would only be useful when the user 406 is in the range 412 of the point of interest 404. Until the user 406 reaches that point, the computing system can compute a direction 402 based on the average of the direction to the closest users 408 that are in the direction of the desired point of interest. In the example given in FIG. 4, node C (user 406) knows that the closest neighbors to the point of interest are nodes A and B (users 408). Thus, the estimated direction may be calculated based on the aggregated direction data to A and B (users 408).

The mesh network structure changes as the users 406, 408, and 410 move. Thus, the direction information is constantly updating according to this movement. For mobile devices that are not equipped with transceivers that are capable of determining location, a knowledge of the environment may be used to determine direction. For example, a simplified map of the location of points of interest may be stored in the device, or provided by the ad-hoc network when the users mobile device joins the ad-hoc network. The simplified map may be as simple as the distance and direction from each point of interest to the surrounding points of interest. Depending on the number of hops from the user to each of the points of interest, a direction may be determined. Further, the distance between each point of interest to the surrounding points of interest may be provided from the devices at each point of interest upon request, for example, when a mobile device joins the ad-hoc network. The distance may be provided in physical units, such as meters, or may be provided in terms of the average number of hops on the shortest path between each of the points of interest.

Alternatively, as the user walks in a particular direction, the data on the number of hops to each of the nearest points of interest may be used to determine direction. If the user is between two points of interest, the number of hops to one will be increasing, while the number of hops to the other will be decreasing. This information may then be used to determine if the user is moving in the correct direction to reach a target point of interest, or needs to change direction.

Figure 5:
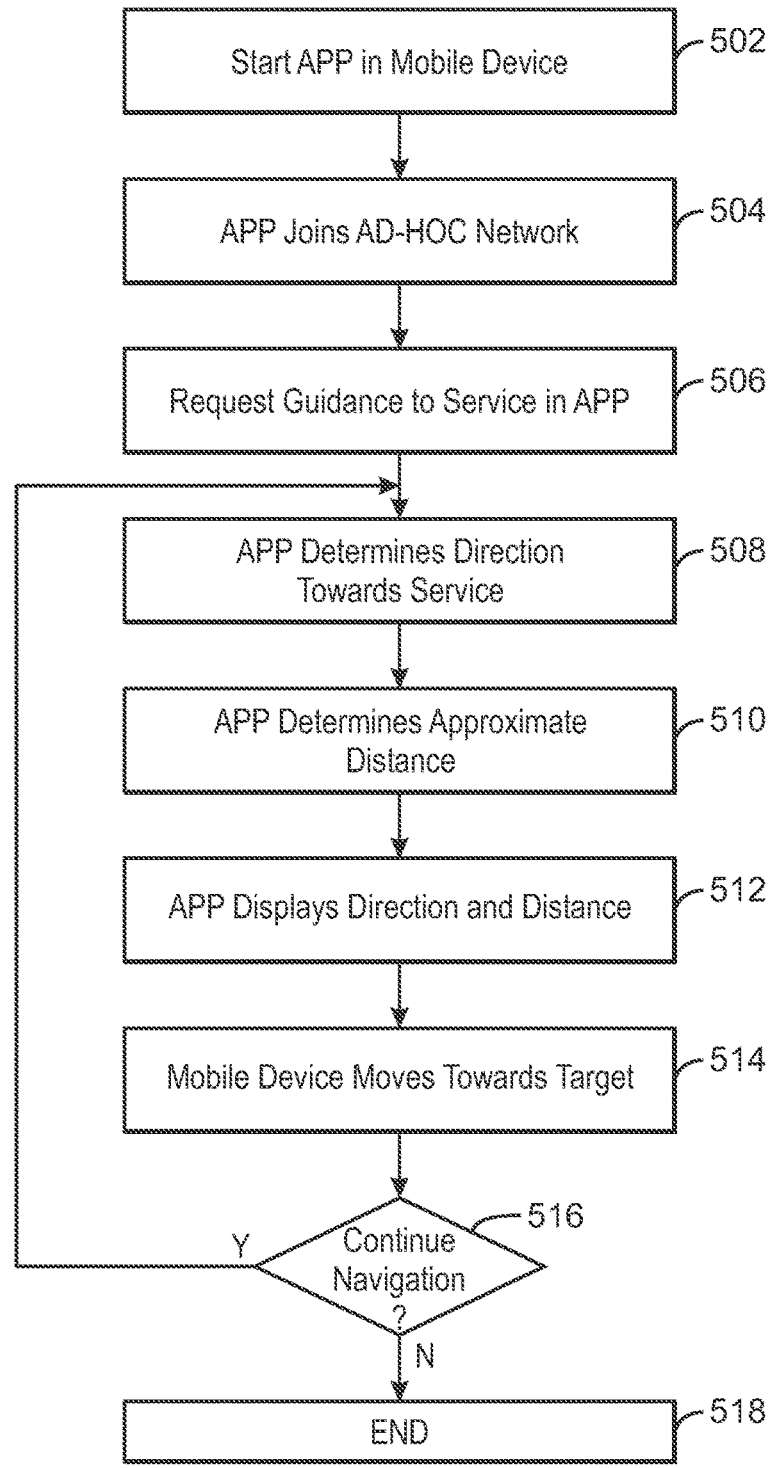
FIG. 5 is a method for using an ad-hoc network to locate a service or point of interest.

FIG. 5 is a method 500 for using an ad-hoc network to locate a service or point of interest. The method 500 begins at block 502 when a user starts a navigation app in a mobile device. At block 504, the app joins an ad-hoc network, for example, by communicating with nearest neighbors to download routing information for communications paths to various points of interest. At block 506, a user may request guidance to a particular point of interest, for example, by selecting from a list of points of interest that are provided by a user interface, for example, from information obtained from the network.

At block 508, the application may determine a direction to the point of interest. This may be determined immediately, for example, from radio direction location, or from information about the environment provided by the ad-hoc network. In one embodiment, the direction determination may be made by comparing distances between points of interest, for example, as provided by the ad-hoc network, to the number of hops to each of the points of interest. The direction from the user to a point of interest can be determined by comparing a relative distance, in hops, to each of a number of points of interest.

At block 510, the approximate distance to the point of interest is determined. This may be determined as the number of hops from the user to the point of interest. Further, as described herein, the distance may be refined by information provided by the ad-hoc network. For example, a distance between points of interest provided by the ad-hoc network may be compared to the number of hops in the shortest path to each point of interest to determine a location estimate for the user. The location estimate may then be used to provide an estimate of the physical distance to a point of interest, for example, in meters.

At block 512, the app displays the direction and distance to the point of interest. The user may then use this information to navigate to the point of interest. At block 514, the user navigates towards the point of interest bringing the mobile device. At block 516, the APP determines if it should continue navigation. For example, the decision may be made by determining if the mobile device has reached the proximity of the target, such as with a preset distance of 10 meters, 5 meters, or less. As another example, the user may cancel the navigation on the APP. If navigation is to continue, process flow returns to block 508. If not, the navigation ends at block 518, for example, by terminating the APP, or by returning to the list of possible points of interest.

The method 500 is not limited to the steps shown. Further, the steps do not have to be in the order shown. For example, the list of services provided to a user may show both a general direction and a distance to each of the points, using the general procedures described herein.

Figure 6:
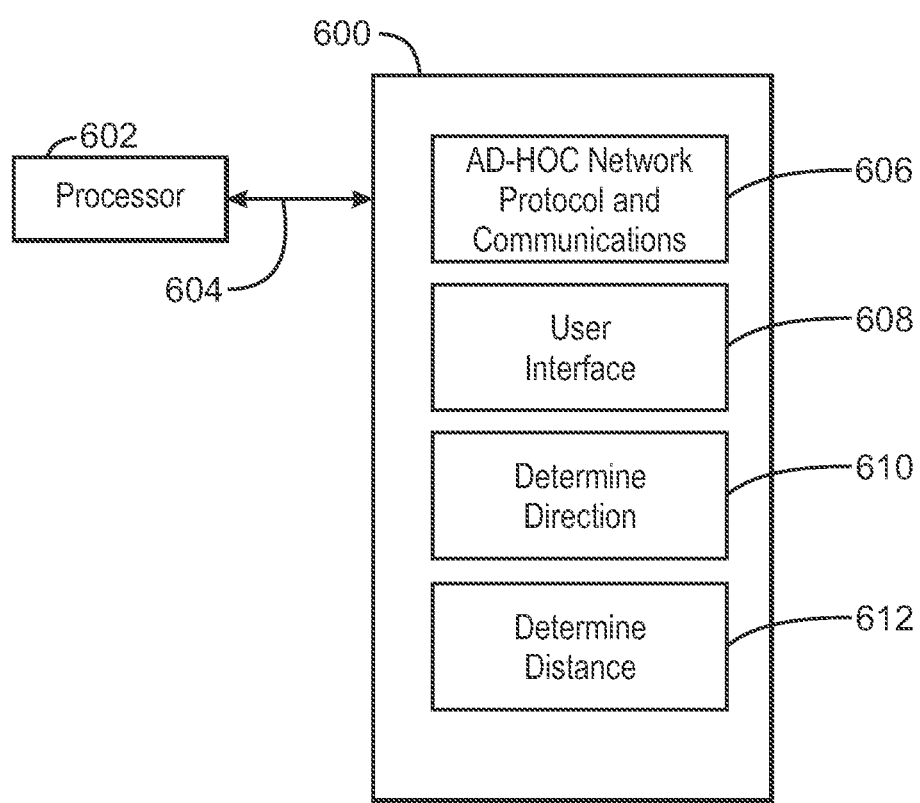
FIG. 6 is a non-transitory, machine readable medium that includes code to direct a processor, for example, in a mobile device, to guide a user towards a point of interest.

FIG. 6 is a non-transitory, machine readable medium 600 that includes code to direct a processor 602, for example, in a mobile device, to guide a user towards a point of interest. The processor 602 may access the code over a bus 604. The non-transitory, machine readable medium 600 includes code 606 that may direct the processor 602 to join an ad-hoc network. For example, this code 606 may direct the processor 602 to function as a router for sending peer-to-peer messages over a shortest route between a target device and a user's mobile device. Further, this code 606 may passively or actively request location information from points of interest to assist in determining the direction and distance to a point of interest.

The non-transitory, machine readable medium 600 may include code 608 that functions as a user interface. This code 608 may present a user with a list of points of interest, so that the user may select the desired point of interest. The list may be downloaded with the app for particular venues, or may be identified from information provided over the ad-hoc network.

The non-transitory, machine readable medium 600 may include code 610 that determines a direction to a point of interest. As described herein, the direction may be determined from radio technology, e.g., determining the directions to nearby units that have shorter paths to the point of interest. Further, the direction can be determined from information provided about relative distance between points of interest, e.g., a virtual map, provided by the ad-hoc network. The code 610 can then compare that information to the distances to each of a number of points of interest to determine the likely direction for the desired point of interest.

The non-transitory, machine readable medium 600 may include code 612 that determines an approximate distance to the point of interest, in hops, or, if sufficient information is present, in physical units. The code 612 to determine distance can be part of the code used to determine direction.

In examples of the present techniques, a mobile device can be used by a user to navigate to a service, or point of interest, using an ad-hoc network generated between mobile devices and devices located at points of interest. This can be useful in crowded venues when insufficient cellular service is present for the mobile devices to be used in other techniques.

Example 1 includes an apparatus for locating a point of interest. The apparatus includes a mobile device, and the mobile device includes a processor, a radio transceiver, and a storage device. The storage device includes code to direct the processor to join an ad-hoc network, interface with a user to initiate navigation to a point of interest, determine a direction to a point of interest, based, at least in part, on the ad-hoc network, and determine an estimated distance to the point of interest based, at least in part, on the ad-hoc network. The code may direct the processor to present a list of available points of interest to the user.

Example 2 incorporates the subject matter of Example 1. In this example, the apparatus includes a wireless local area network (WLAN) transceiver.

Example 3 incorporates the subject matter of any combination of Examples 1-2. In this example, the apparatus includes a Bluetooth® transceiver.

Example 4 incorporates the subject matter of any combination of Examples 1-3. In this example, the radio transceiver determines a direction for devices that the mobile device is in communication.

Example 5 incorporates the subject matter of any combination of Examples 1-4. In this example, the storage device is a solid state disk drive.

Example 6 incorporates the subject matter of any combination of Examples 1-5. In this example, the apparatus includes a touch screen display for user input.

Example 7 incorporates the subject matter of any combination of Examples 1-6. In this example, the mobile device may be a cellular phone or a tablet.

Example 8 incorporates the subject matter of any combination of Examples 1-7. In this example, the code includes a navigation application (app), downloaded for a venue.

Example 9 incorporates the subject matter of any combination of Examples 1-8. In this example, the point of interest is a stadium, a concert hall, a sports complex, a convention center, a convention site, or any combinations thereof.

Example 10 provides a method for locating points of interest. The method includes establishing an ad-hoc network between mobile devices and fixed location devices, wherein the fixed location devices are associated with points of interest. A distance is determined from a mobile device to a point of interest based, at least in part, on the number of hops between the mobile device and other mobile devices to reach the point of interest. A direction to the point of interest is determined based, at least in part, on the number of hops between other mobile devices proximate to the mobile device and the point of interest.

Example 11 incorporates the subject matter of Example 10. In this example, the method includes displaying a list of points of interest on the mobile device and providing navigation information for a selected point of interest.

Example 12 incorporates the subject matter of any combination of Examples 10-11. In this example, a directional indicator is displayed on the mobile device, wherein the direction indicator indicates the direction to move to reach the point of interest.

Example 13 incorporates the subject matter of any combination of Examples 10-12. In this example, a distance indicator is displayed on the mobile device, wherein the distance indicator provides an estimate of the distance to the point of interest.

Example 14 incorporates the subject matter of any combination of Examples 10-13. In this example, a direction to proximate mobile devices is determined based, at least in part, on a radio location determination.

Example 15 incorporates the subject matter of any combination of Examples 10-14. In this example, a direction to the point of interest may be determined as an average direction of the proximate mobile devices having the lowest number of hops to the point of interest.

Example 16 incorporates the subject matter of any combination of Examples 10-15. In this example, a direction to the point of interest is determined by comparing the shortest paths to a number of points of interest to the distances between those points of interest.

Example 17 incorporates the subject matter of any combination of Examples 10-16. In this example, a distance to the point of interest is determined by comparing the shortest paths to a number of points of interest to the distances between those points of interest.

Example 18 incorporates the subject matter of any combination of Examples 10-17. In this example, a distance is determined in physical units based, at least in part, by comparing the number of hops to each of a number of points of interest to the physical distance between the points of interest.

Example 19 incorporates the subject matter of any combination of Examples 10-18. In this example, distances between each of a number of points of interest are obtained from the ad-hoc network.

Example 20 incorporates the subject matter of any combination of Examples 10-19. In this example, distances between each of a number of points of interest are downloaded with a navigation application.

Example 21 incorporates the subject matter of any combination of Examples 10-20. In this example, the method includes navigating between an indoor venue and an outdoor venue to reach the point of interest.

Example 22 includes a non-transitory, machine readable medium that includes code to direct a processor to establish communications with proximate devices in an ad-hoc network, determine a direction to a point of interest from the ad-hoc network, and determine a distance to a point of interest from the ad-hoc network.

Example 23 incorporates the subject matter of Example 22. In this example, code is included to direct the processor to provide a list of points of interest and record a user selection of the point of interest.

Example 24 incorporates the subject matter of any combination of Examples 22-23. In this example, code is included to direct the processor to identify directions for the proximate devices.

Example 25 incorporates the subject matter of any combination of Examples 22-24. In this example, code is included to direct the processor to determine a relative location for a mobile device by comparing path lengths to a number of points of interest to a distance between each of the number of points of interest.

Example 26 includes a mobile device that has a processor, a radio transceiver, and a storage device. The storage device includes code to direct the processor to join an ad-hoc network, interface with a user to initiate navigation to a point of interest, determine a direction to a point of interest based, at least in part, on the ad-hoc network, and determine an estimated distance to the point of interest based, at least in part, on the ad-hoc network.

Example 27 incorporates the subject matter of Examples 26. In this example, the mobile device includes code to present a list of available points of interest to the user.

Example 28 incorporates the subject matter of any combination of Examples 26-27. In this example, the mobile device includes a wireless local area network (WLAN) transceiver.

Example 29 incorporates the subject matter of any combination of Examples 26-28. In this example, the mobile device may include a Bluetooth® transceiver.

Example 30 incorporates the subject matter of any combination of Examples 26-29. In this example, the radio transceiver determines a direction for devices that the mobile device is in communication.

Example 31 incorporates the subject matter of any combination of Examples 26-30. In this example, the storage device includes a solid state disk drive.

Example 32 incorporates the subject matter of any combination of Examples 26-31. In this example, the mobile device includes a touch screen display for user input.

Example 33 incorporates the subject matter of any combination of Examples 26-32. In this example, the mobile device is a cellular phone or a tablet.

Example 34 incorporates the subject matter of any combination of Examples 26-33. In this example, the mobile device includes code for a navigation application (app), downloaded for a venue.

Example 35 includes a method for locating points of interest. The method includes a means for establishing an ad-hoc network between mobile devices and fixed location devices, wherein the fixed location devices are associated with points of interest. The method also includes a means for determining a distance from a mobile device to a point of interest, and a means for determining a direction to the point of interest.

Example 36 incorporates the subject matter of Example 35. In this example, the method includes a means for displaying a list of points of interest on a mobile device and a means for providing navigation information for a selected point of interest.

Example 36 incorporates the subject matter of any combination of Examples 35-36. In this example, the mobile device includes a means for displaying a directional indicator, wherein the direction indicator instructs the user as to the direction to move to reach the point of interest.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus for locating a point of interest, comprising a mobile device, wherein the mobile device comprises:
    a processor;
    a radio transceiver; and
    a storage device, wherein the storage device comprises code to direct the processor to:
        join an ad-hoc network;
        interface with a user to initiate navigation to a point of interest;
        determine a direction to a point of interest based, at least in part, on the number of hops between the mobile device and other mobile devices to reach the point of interest; and
        determine an estimated distance to the point of interest based, at least in part, on the number of hops between the mobile device and other mobile devices to reach the point of interest on the ad-hoc network.

2. The apparatus of claim 1, comprising code to present a list of available points of interest.

3. The apparatus of claim 1, comprising a wireless local area network (WLAN) transceiver.

4. The apparatus of claim 1, comprising a Bluetooth® transceiver.

5. The apparatus of claim 1, wherein the radio transceiver is to determine a direction for devices that the mobile device is in communication.

6. The apparatus of claim 1, wherein the storage device comprises a solid state disk drive.

7. The apparatus of claim 1, comprising a touch screen display.

8. The apparatus of claim 1, wherein the mobile device comprises a cellular phone or a tablet.

9. The apparatus of claim 1, wherein the code comprises a navigation application (app), downloaded for a venue.

10. The apparatus of claim 1, wherein the point of interest is in a stadium, a concert hall, a sports complex, a convention center, a convention site, or any combinations thereof.

11. A method for locating points of interest, comprising:
    establishing an ad-hoc network between mobile devices and fixed location devices, wherein the fixed location devices are associated with points of interest;
    determining a distance from a mobile device to a point of interest, based at least in part, on the number of hops between the mobile device and other mobile devices to reach the point of interest; and
    determining a direction to the point of interest, based at least in part, on the number of hops between other mobile devices proximate to the mobile device and the point of interest.

12. The method of claim 11, comprising:
    displaying a list of points of interest on the mobile device; and
    providing navigation information for a selected point of interest.

13. The method of claim 11, comprising displaying a directional indicator on the mobile device, wherein the direction indicator indicates the direction to move to reach the point of interest.

14. The method of claim 11, comprising displaying a distance indicator on the mobile device, wherein the distance indicator provides an estimate of the distance to the point of interest.

15. The method of claim 11, comprising determining a direction to proximate mobile devices, based at least in part, on a radio location determination.

16. The method of claim 15, comprising determining the direction to the point of interest as an average direction of the proximate mobile devices having the lowest number of hops to the point of interest.

17. The method of claim 11, comprising determining the direction to the point of interest by comparing the shortest paths to a plurality of points of interest to the distances between those points of interest.

18. The method of claim 11, comprising determining the distance in physical units, based, at least in part, by comparing the number of hops to each of a plurality of points of interest to the physical distance between the plurality of the points of interest.

19. The method of claim 11, comprising obtaining the distances between each of a plurality of points of interest from the ad-hoc network.

20. The method of claim 11, comprising downloading the distances between each of a plurality of points of interest with a navigation application.

21. The method of claim 11, comprising navigating between an indoor venue and an outdoor venue to reach the point of interest.

22. A non-transitory, machine readable medium comprising code to direct a processor to:
    establish communications with proximate devices in an ad-hoc network;
    determine a direction to a point of interest from the ad-hoc network based, at least in part, on the number of hops between the mobile device and other mobile devices to reach the point of interest; and
    determine a distance to a point of interest from the ad-hoc network based, at least in part, on the number of hops between the mobile device and other mobile devices.

23. The non-transitory, machine readable medium of claim 22, comprising code to direct the processor to:
    provide a list of points of interest; and
    record a selection of the point of interest.

24. The non-transitory, machine readable medium of claim 22, comprising code to direct the processor to identify directions for the proximate devices.

25. The non-transitory machine readable medium of claim 22, comprising determining a relative location for a mobile device by comparing path lengths to a plurality of points of interest to a distance between each of the plurality of points of interest.

* * * * *